G. WALKER.
COUNTER SCALE.
APPLICATION FILED JUNE 12, 1912.
1,048,242.
Patented Dec. 24, 1912.
4 SHEETS—SHEET 1.
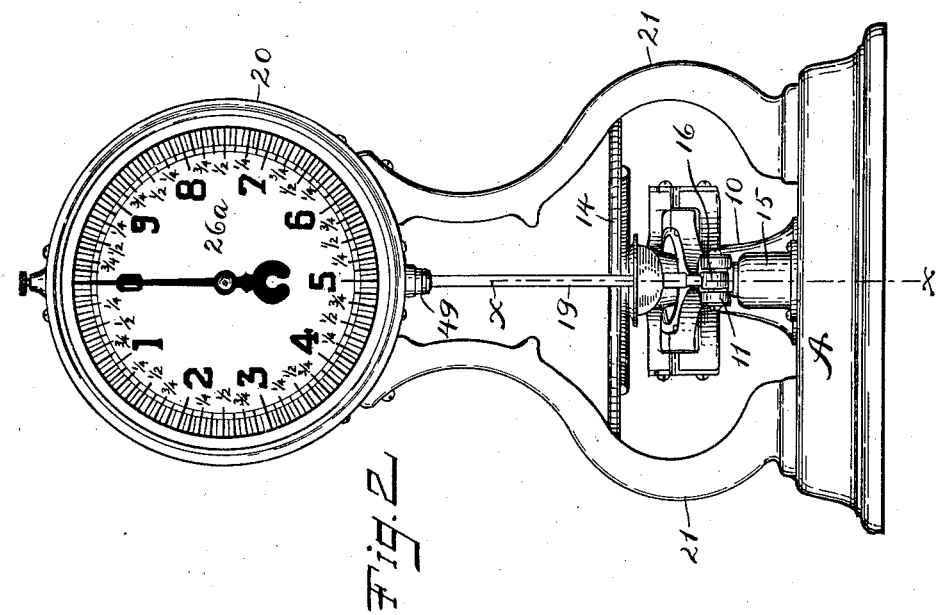
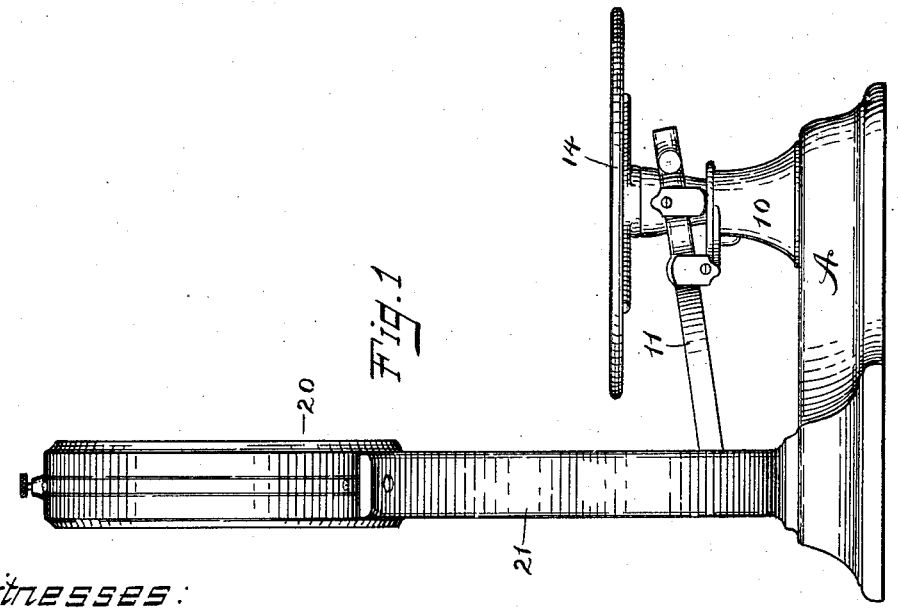
Witnesses:
S. H. Clarke
Roger Edwards
Inventor
George Walker.
By Louis M. Schmidt
Atty.

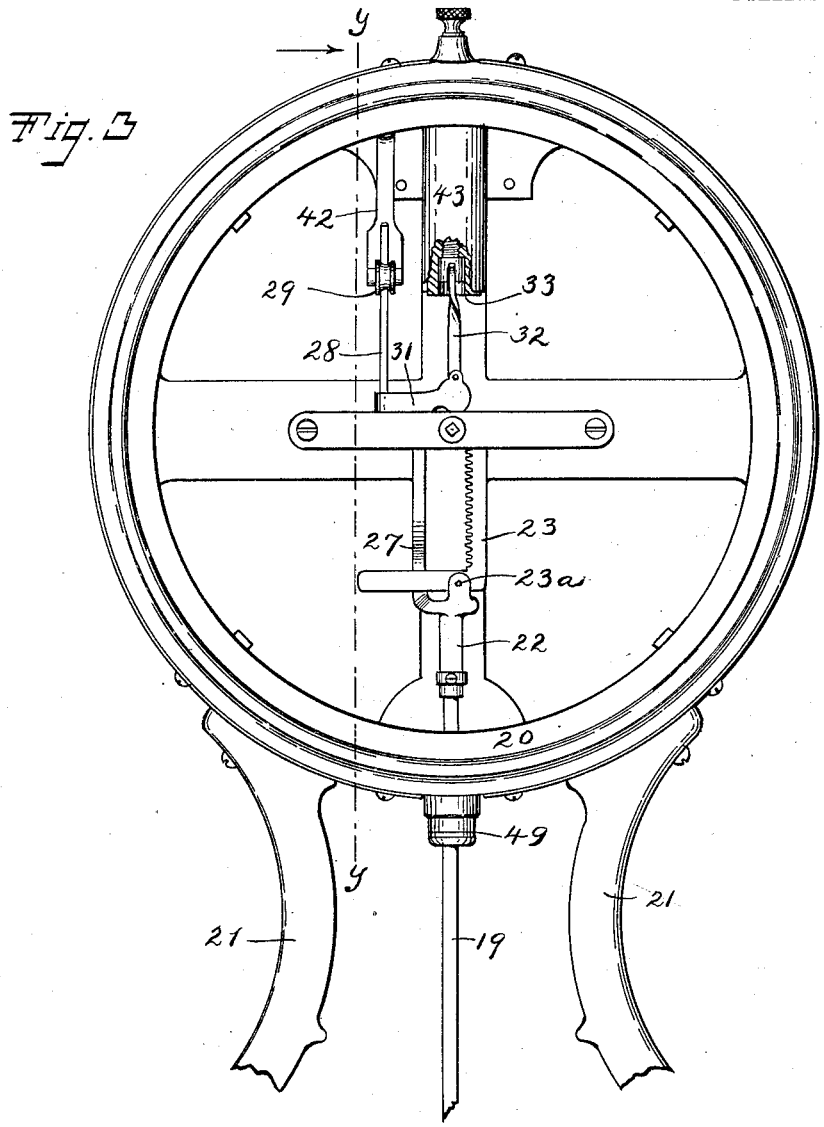

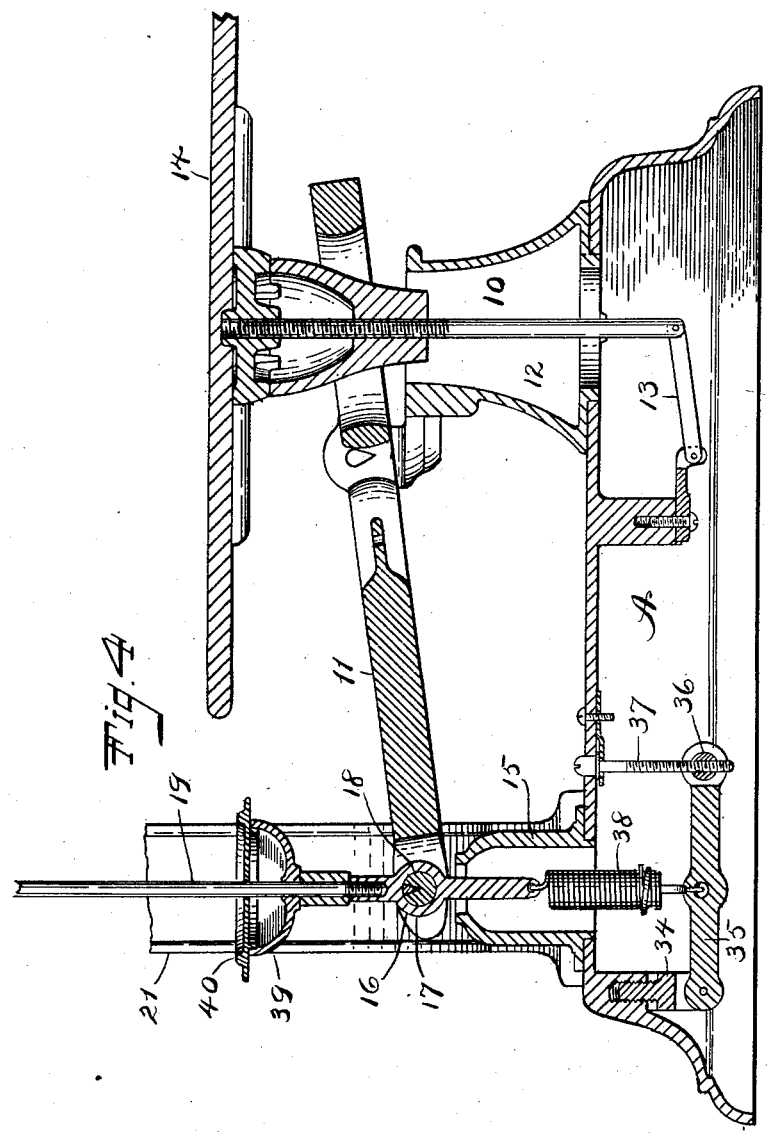

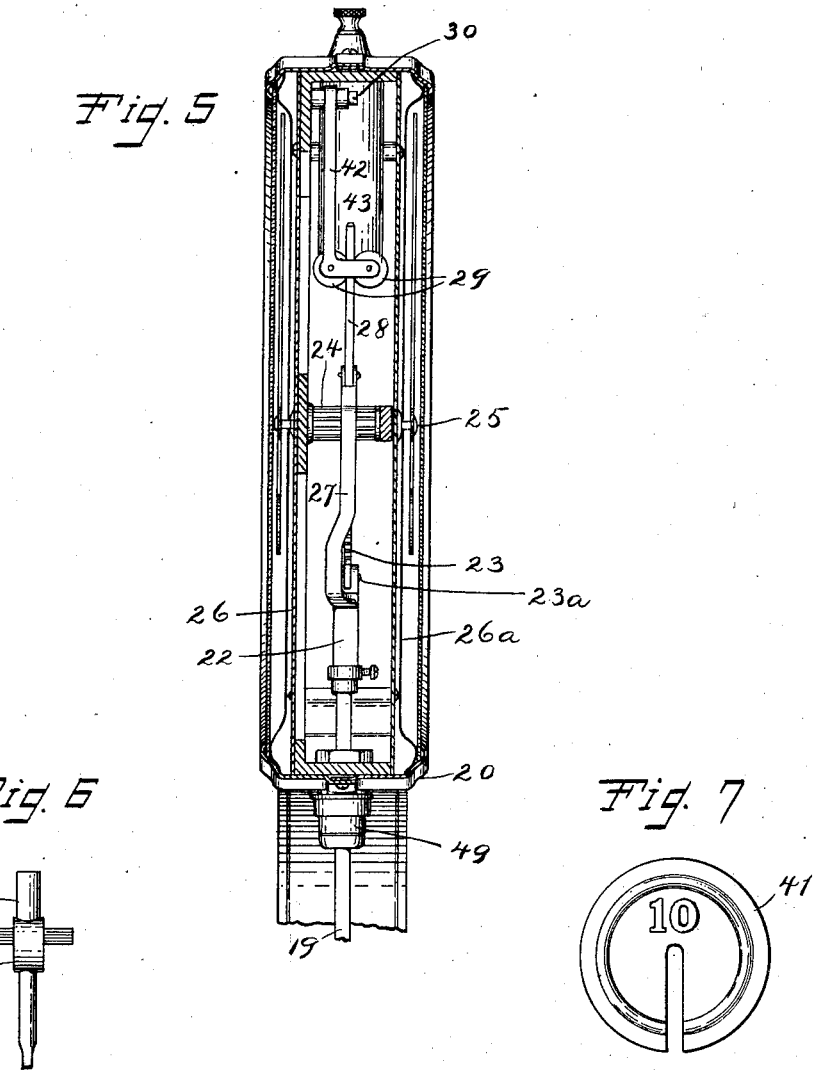

UNITED STATES PATENT OFFICE.

GEORGE WALKER, OF NEW BRITAIN, CONNECTICUT, ASSIGNOR TO LANDERS, FRARY & CLARK, OF NEW BRITAIN, CONNECTICUT, A CORPORATION.

COUNTER-SCALE.

1,048,242.

Specification of Letters Patent.

Patented Dec. 24, 1912.

Application filed June 12, 1912. Serial No. 703,150.

*To all whom it may concern:*

Be it known that I, GEORGE WALKER, a citizen of the United States, residing at New Britain, in the county of Hartford and State of Connecticut, have invented certain new and useful Improvements in Counter-Scales, of which the following is a specification.

My invention relates to improvements in counter scales and the object of my invention is a general reorganization of the scale with reference to utility, convenience and capacity.

In the accompanying drawing:—Figure 1 is a side elevation of my scale. Fig. 2 is a rear elevation of the same. Fig. 3 is an enlarged rear elevation of the dial frame, a portion of its standard and the parts within the said dial frame, the rear dial being removed. Fig. 4 is a sectional view of the base or platform portion of my scale on the line $x$ $x$ of Fig. 2, some of the parts being shown in elevation and others broken off. Fig. 5 is a sectional view of the dial portion on the line $y$ $y$ of Fig. 3. Fig. 6 is a front elevation of the connection for the longer end of the scale lever. Fig. 7 is a plan view of a ten pound weight for application to the longer end of the scale lever.

A designates the base of the scale which is designed for use upon a counter or table and upon which base the other parts are mounted. At one end of this base a standard or hollow post 10 is mounted to which the scale lever 11 is pivoted and to which lever the pan or platform upright 12 is pivoted toward its upper end, the lower end of the said upright being pivoted to the link 13 within the base 10, a pan or platform 14 being placed on the upper end of the upright, all substantially as in my Patent 909,486 of Jan. 12, 1909. At the opposite end of the base A underneath the longer end of the scale lever 11 is a boss 15, the upper end of which serves as a stop for the said lever. A connection 16, having a socket 17 for the pivotal block 18, extends vertically upward from within the said boss and is pivoted to the fork at the longer end of the scale lever 11 by knife edge pivots that project from the ends of the block 18.

A push rod 19 is secured to the upper end of the connection 16 and passes upwardly through a boss 49 in the lower part of the dial frame 20, the said frame being supported on the base A by standards 21. A rack carrier 22 is secured to the upper end of the push rod 19 to which carrier a rack 23 is suitably pivoted at 23ª for engagement with the ordinary dial pinion 24 on the dial shaft 25 that carries, at its opposite ends, the ordinary pointers for the front and rear dials 26 and 26ª respectively. The said rack carrier is also provided with an extension 27 at the upper end of which is a guide rod 28 that passes between two grooved rollers 29 mounted on the lower end of a lever or pendant 42 that is pivoted by its upper end to the dial frame 20 as shown at 30 Fig. 5. At the upper part of the dial frame there is a pneumatic cylinder 43 rigidly mounted thereon in accordance with my Patent No. 979,611 of Dec. 27, 1910. The said extension of the rack carrier has an arm 31 to which the lower end of the piston rod 32 is pivoted, the upper end of the said piston rod being pivoted within the piston 33 as shown in Fig. 3. Within the base A under the connection 16 is a stud or post 34 to which one end of a lever 35 is pivoted, the other end of the said lever being provided with a rocking nut 36 to receive the lower end of the adjusting screw 37, the head of which is accessible from the top of the base, the said screw being confined against endwise movement by any suitable means. A counter-balancing spring 38 is secured by one end to the said lever 35 and by its other end to the lower end of the connection for the push rod 19. The connection 16 is practically a part of the push rod except for convenience of construction. The spring is secured in axial alinement with the push rod and serves to center the lower end thereof. A cup 39 and weight support 40 are mounted on the push rod 19 above the connection 16 for use in connection with an extra weight 41 in order to double the capacity of the scale.

The load to be weighed is placed on the platform 14 thereby depressing that end of the scale lever, raising its longer end and at the same time forcing the push rod 19 and connected parts upwardly. This upward movement is resisted by the counter-balancing spring 38, and also by the pneumatic dash pot as the rack bar and piston move upwardly with the push rod. The rack bar engages with and operates the dial pinion and pointers in substantially the ordinary manner. The guide rod rollers and pendant lever in connection with the cylinder and piston properly guide the upper end of the push rod and connected parts and at the same time leave it perfectly free to move in various directions so that there is no possibility of cramping or binding either the push rod and rack or the dash pot mechanism. The said guide rod and roller guides, either with or without the dash pot, serves to yieldingly guide the upper end of the rack carrier and its rack. The counter-balancing spring may be adjusted as described by means of the adjusting screw 37. In addition to this adjustment, shot or other material may be placed in the cup 39 or in the cup under the platform 14. As shown the capacity of the scale is ten pounds and this may be doubled, if desired, by the application of a ten pound weight to the weight support 40 on the push rod, in which case the weight will be just ten pounds more than that indicated on dials.

By my improvements, the construction is simple and inexpensive while at the same time the general arrangement of a scale lever and spring in a counter scale is compact, convenient and efficient for weighing twice the quantity of an ordinary spring scale.

I claim as my invention:—

1. The combination of a base, a scale lever and platform pivotally mounted at one end of the said base, a dial frame and dial mounted over the other end of the said base and lever, a dial pinion within the said dial frame, a push rod pivotally connected to the longer end of the said scale lever in the same vertical plane as the axis of the said dial pinion, and extended upwardly from said connection through the said dial frame to the interior thereof, a spring connected with the said push rod, extended down and secured within the said base, a rack carrier mounted on the upper end of the said push rod, and a rack pivotally mounted on the said rack carrier in engagement with the said dial pinion.

2. The combination of a base, a scale lever and platform pivotally mounted at one end of the said base, a rack and pinion within the said dial frame, a push rod connected with the said rack and pivotally connected to the longer end of the said scale lever, extended downwardly a distance within the said base below its pivotal connection with the said scale lever, and upwardly above the same within the said dial frame, and a spring secured by one end within the said base and by its other end to the lower end of the said push rod in alinement therewith, whereby the lower end of the said push rod is centered and guided by the combined action of the said spring and the pivotal connection of the push rod with the said scale lever.

3. The combination of a base, a scale lever and platform pivotally mounted at one end of the said base above its top, a dial frame and dial mounted at the other end of the said base above its top, a rack and pinion within the said dial frame, a push rod connected with the said rack and pivotally connected with the longer end of the said lever, extended downwardly within the said base and upwardly through the said dial frame to the interior thereof, a spring secured by one end within the said base and by its other end to the lower end of the said push rod, and means within the said base and its top for adjusting the tension of the said spring from without the said base.

4. The combination of a base, a scale lever suitably mounted on the said base at one end thereof, a dial frame and dial mounted on the said base at its other end, a rack and pinion within the said dial frame, a push rod connected with the said scale lever and carrying the said rack, a spring connected by one end to the said push rod and by its other end within the said base, a weight support on the said push rod and a weight for application to said weight support when desired.

5. In weighing scales, the combination of a dial frame and dial, a pinion centrally mounted therein, a reciprocating push rod, a rack carried by the said push rod, a spring connected by one end to the lower end of the said push rod and by its other end to a suitable support, and means for yieldingly guiding the upper end of the said push rod within the said dial frame.

6. In weighing scales, the combination of a dial frame, a reciprocating push rod extended through the lower part of the said frame, a rack carrier on the upper end of the said rod within the said frame, a rack carried thereby, a pinion in the said dial frame in engagement with the said rack, a guide rod extended upwardly from the said rack carrier and roller guides for the said guide rod to move within.

7. In weighing scales, the combination of a dial frame, a reciprocating push rod extended through the lower part of the said frame, a rack carrier mounted on the upper end of the said push rod, a rack carried thereby, a pinion in the said dial frame in engagement with the said rack, a guide rod extended upwardly from the said rack carrier, a pendant lever pivoted by its upper end within the said dial frame, and a pair of roller guides at the lower end of the said pendant lever with the said guide rod extended between the said guide rollers.

8. In weighing scales, the combination of a dial frame, a reciprocating push rod extended through the lower part of the said dial frame, a rack carrier at the upper end of the said push rod, a rack carried thereby, a pinion in the dial frame in engagement with the said rack, a guide rod at the upper part of the said rack carrier, roller guides for the said guide rod, a dash pot cylinder fixed within the said dial frame, a piston therein and a piston rod jointedly connected by one end to the said piston and by its other end to the said rack carrier, whereby the upper end of the push rod and the dash pot piston rod are yieldingly guided.

GEORGE WALKER.

Witnesses:
P. V. GUIBERSON,
HAROLD GRACE.

Copies of this patent may be obtained for five cents each, by addressing the "Commissioner of Patents, Washington, D. C."